United States Patent [19]

Schievelbein

[11] 4,187,073

[45] Feb. 5, 1980

[54] SURFACTANT FLOODING OIL RECOVERY PROCESS

[75] Inventor: Vernon H. Schievelbein, Houston, Tex.

[73] Assignee: Texaco Inc., White Plains, N.Y.

[21] Appl. No.: 858,926

[22] Filed: Dec. 9, 1977

[51] Int. Cl.$^2$ .............................................. E21B 43/22
[52] U.S. Cl. ................................ 252/8.55 D; 166/275; 252/314
[58] Field of Search ................. 252/8.55 D, 314, 353; 166/275, 274

[56] References Cited

U.S. PATENT DOCUMENTS

| | | | |
|---|---|---|---|
| 3,637,014 | 1/1972 | Jones | 166/273 |
| 3,663,477 | 5/1972 | Ahearn | 252/8.55 X |
| 3,827,497 | 8/1974 | Dycus et al. | 166/274 |
| 3,977,471 | 8/1976 | Gale et al. | 252/8.55 X |
| 4,018,278 | 4/1977 | Shupe | 252/8.55 X |

*Primary Examiner*—Herbert B. Guynn

*Attorney, Agent, or Firm*—Carl G. Ries; Thomas H. Whaley; Jack H. Park

[57] ABSTRACT

The effectiveness of an aqueous, saline surfactant fluid, especially one containing as essentially the only surfactant an alkylpolyalkoxyalkyl sulfonate or an alkylarylpolyalkoxyalkyl sulfonate for oil recovery by surfactant flooding is increased substantially if the fluid is subjected to a high shear rate for a predetermined period of time prior to injecting the fluid into the oil containing formation. The surfactant fluid should be subjected to a shear rate of at least 150 and preferably at least 250 reciprocal seconds for a period of time of at least 0.1 minutes and preferably at least 0.5 minutes. The improvements obtained by shearing the surfactant fluid include increased stability of the solution, i.e., resistance to separation into separate, distinct phases, reduced turbidity of the fluid which provide improved injectivity with reduced well plugging problems, and attainment of significantly lower interfacial tension between the aqueous surfactant fluid and formation petroleum, and more effective oil displacement from reservoir rock.

5 Claims, 1 Drawing Figure

SURFACTANT FLOODING OIL RECOVERY PROCESS

FIELD OF THE INVENTION

This invention pertains to a surfactant flooding oil recovery process. More specifically, this invention pertains to a surfactant flooding oil recovery process in which the fluid is first treated to improve its stability, injectivity, and effectiveness for a low surface tension oil displacement.

BACKGROUND OF THE INVENTION

Petroleum is found in subterranean formations or reservoirs in which it has accumulated, and recovery is usually accomplished initially by so called primary production comprising pumping or permitting the petroleum to flow to the surface of the earth through wells drilled into and completed in the subterranean petroleum formation. Petroleum can be recovered from subterranean formations only if certain conditions exist. There must be an adequate concentration of petroleum in the formation and there must be adequate permeability or interconnected flow channels throughout the formation to permit the flow of fluids therethrough if sufficient pressure is applied to the fluid. When the subterranean, petroleum-containing formation has natural energy present in the form of an underlying active water drive, solution gas, or a high pressure gas cap above the petroleum within the formation, this natural energy is utilized to recovery petroleum. In the primary phase of petroleum recovery, petroleum flows to wells drilled in the formation, the petroleum being displaced toward the wells by naturally occurring energy in the formation. When the natural energy source is depleted, or in the instance of those formations which do not originally contain sufficient natural energy to permit primary petroleum recovery operations, some form of supplemental recovery process must be applied to the reservoir. Supplemental recovery is frequently referred to in the literature as secondary or tertiary recovery, although in fact it may be primary, secondary or tertiary in sequence of employment.

Petroleum recovery operations involving the injection of water into the formation for the purpose of displacing petroleum toward the producing wells, commonly referred to as water flooding or secondary recovery, is the most economically and widely practiced form of supplemental recovery. Water does not displace petroleum efficiently, however, since water and oil are immiscible and the interfacial tension between water and oil is quite high. Persons skilled in the art of oil recovery have recognized this weakness of water flooding and many additives have been described in the prior art for decreasing the interfacial tension between the injection water and the formation petroleum. Petroleum sulfonates have been disclosed in many references for use in surfactant water-flooding oil recovery operations, but petroleum sulfonates have limitations with respect to formation water salinity, hardness, and other factors which restrict the usefulness thereof. U.S. Pat. No. 3,811,504 describes a three component surfactant system comprising an anionic surfactant such as alkyl or alkylaryl sulfonate plus a nonionic surfactant such as polyethoxylated alkyl phenol and a alkylpolyethoxy sulfate. U.S. Pat. No. 3,811,505 described a dual surfactant system employing an anionic surfactant such as an alkyl or alkylaryl sulfonate or phosphate, plus a nonionic surfactant such as a polyethoxylated alkyl phenol or polyethoxylated aliphatic alcohol. U.S. Pat. No. 3,811,507 describes an oil recovery method using a dual surfactant system comprising anionic surfactants such as a linear alkyl or linear alkylaryl sulfonate, plus a sulfated polyethoxylated aliphatic alcohol. These systems permit the use of surfactant flooding processes in formations containing water containing from 500 to 12,000 parts per million polyvalent ions, such as calcium and magnesium. U.S. Pat. No. 4,018,278 relates to a surfactant oil recovery process suitable for use in high temperature formations containing very high salinity formation water, employing a single surfactant-containing fluid, the surfactant being an alkylpolyethoxy sulfonate or an alkylarylpolyethoxy sulfonate in a saline fluid whose salinity is about equal to the salinity of the formation water. U.S. Pat. Nos. 3,827,497 and 3,890,239 relate to a surfactant fluid and an oil recovery processe employing a fluid containing an organic sulfonate, a sulfated or sulfonated oxyalkylated alcohol and a polyalkylene glycol alkyl ether. U.S. Pat. No. 3,977,471 describes an oil recovery process employing an alkylarylpolyalkoxyalkyl sulfonate. U.S. Pat. No. 3,333,634 describes an oil recovery method employing a shear-thickening surfactant fluid containing an alkylaryloxypoly(ethoxy)ethanol and a dialkyl sulfosuccinate.

The surfactant fluid to be injected into a subterranean, petroleum-containing formation for petroleum recovery purposes must be injected into a relatively low permeability formation, and so the injectivity of the fluid is of critical importance. The presence of dispersed particulate matter which may cause plugging of the subterranean formation will lead to serious problems, since the fluid must be injected into the formation over long periods of time, and plugging is especially significant if it occurs in the portion of the petroleum-containing formation immediately adjacent to the injection wells. Furthermore, the fluid must be present in the relatively hostile environment of the subterranean, petroleum-containing formation for long periods of time, in the order of many months to several years, as it passes through the portion of the formation to be swept by injected fluid between the injection well and production well. The fluid must, therefore, remain relatively stable, both chemically and physically, over the period of time it will be present in the formation. Phase instability is frequently encountered in the use of the more complex surfactants which are used for recovering oil from formations containing relatively high salinity water. Once phase instability has occurred, the oil recovery effectiveness of the fluid is destroyed, and so it is of paramount importance to ensure that the fluid will remain phase stable for the period of time it remains in the formation. Finally, the fluid will effectively displace oil from the microscopic pores, including the smaller flow channels and dead-end pore spaces of the formation, only if the interfacial tension, i.e., the surface tension between the aqueous surfactant-containing phase and the formation petroleum, can be maintained at a very low level. Accordingly, it can be appreciated that attainment of the lowest possible interfacial tension is of critical importance to the successful application of the surfactant fluid to oil recovery operations.

It is, therefore, an object of the present invention, to treat surfactant fluids to increase the ease with which they are injected into a relatively low permeability oil formation without encountering injectivity or plugging problems.

It is a further object of the present invention to increase the stability of a surfactant fluid, thereby increasing the time which the surfactant fluid will remain in the necessary single phase condition without separating into multiple phases which degrades the effectiveness of the surfactant fluid for surfactant flooding purposes.

It is still another object of the present invention to provide a treatment for a surfactant fluid to be used for surfactant flooding oil recovery purposes, so as to increase the effectiveness of the fluid for reducing interfacial tension between the surfactant fluid and formation petroleum, thereby increasing the microscopic displacement efficiency of the surfactant fluid.

At least certain of the foregoing objects will be met by at least some of the preferred embodiments of my invention to be described more fully hereinafter below.

SUMMARY OF THE INVENTION

Briefly, my invention concerns an improvement in an oil recovery process comprising injecting a surfactant-containing aqueous fluid into a petroleum-containing formation, for the purpose of displacing petroleum through the formation toward a production well, said fluid displacing petroleum more efficiently and in greater quantities than water or field brine would be capable of accomplishing under similar injection conditions. More specifically, the process of my invention involves a method of treating a surfactant-containing fluid prior to injecting it into a subterranean, petroleum formation by subjecting the fluid at the surface to very high shear rate for at least a minimum period of time, prior to injecting it into the formation. Specifically, I have found that a surfactant fluid should be subjected to a shear rate of at least 150 reciprocal seconds and preferably at least 250 reciprocal seconds for a period of time of at least 0.1 minutes and preferably at least 0.5 minutes, prior to injecting it into the formation. This is substantially greater shear than occurs during normal mixing and pumping during the injection process, and is substantially greater than the shear which results from flowing the fluid through formation flow channels. The surfactant fluid which is especially benefitted by this treatment is an aqueous fluid having a salinity of at least 20,000 parts per million total dissolved solids, which may include substantial quantities of divalent ions such as calcium and magnesium, and containing as the primary surfactant, or essentially the only surfactant, a water soluble sodium, potassium lithium, or ammonium salt of an aliphaticpolyalkoxyalkyl sulfonate or an alkylarylpolyalkoxyalkyl sulfonate having the following formula:

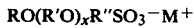

$$RO(R'O)_xR''SO_3^- M^+$$

wherein R is an aliphatic group such as an alkyl group, linear or branched having from 9 to 25 and preferably from 12 to 18 carbon atoms, or an alkylaryl group, such as a benzene, toluene or xylene having attached thereto at least one alkyl group having from 9 to 15 carbon atoms, R' is ethylene or a mixture of ethylene and propylene or other higher alkylene with relatively more ethylene than higher alkylene and R'' is ethyl, propyl, hydroxy propyl or butyl, x is a number from 2 to 10 and preferably from 3 to 7 including fractions, and M is a monovalent cation, preferably sodium, potassium, lithium or ammonium.

By shearing the above described surfactant-containing fluid for the prescribed period of time and at the stated shear rate, the turbidity of the fluid is reduced significantly, and the fluid may be injected into lower permeability formations over long periods of time with reduced injectivity or well plugging problems. Moreover, the fluid exhibits greater phase stability as a result of shearing, which increases the period of time that the fluid is effective in the formation while recovering petroleum. Finally, the interfacial tension of the fluid is reduced significantly, which increases its effectiveness as a low surface tension oil displacing fluid.

BRIEF DESCRIPTION OF THE DRAWING

The attached FIGURE illustrates the oil recovery efficiency of two surfactant waterfloods, the first of which employed a fluid sheared in accordance with the process of my invention and the second of which was identical to the first except that the surfactant fluid was mixed but not sheared.

DETAILED DESCRIPTION OF THE PREFERRED EMBODIMENTS

Figure 1:
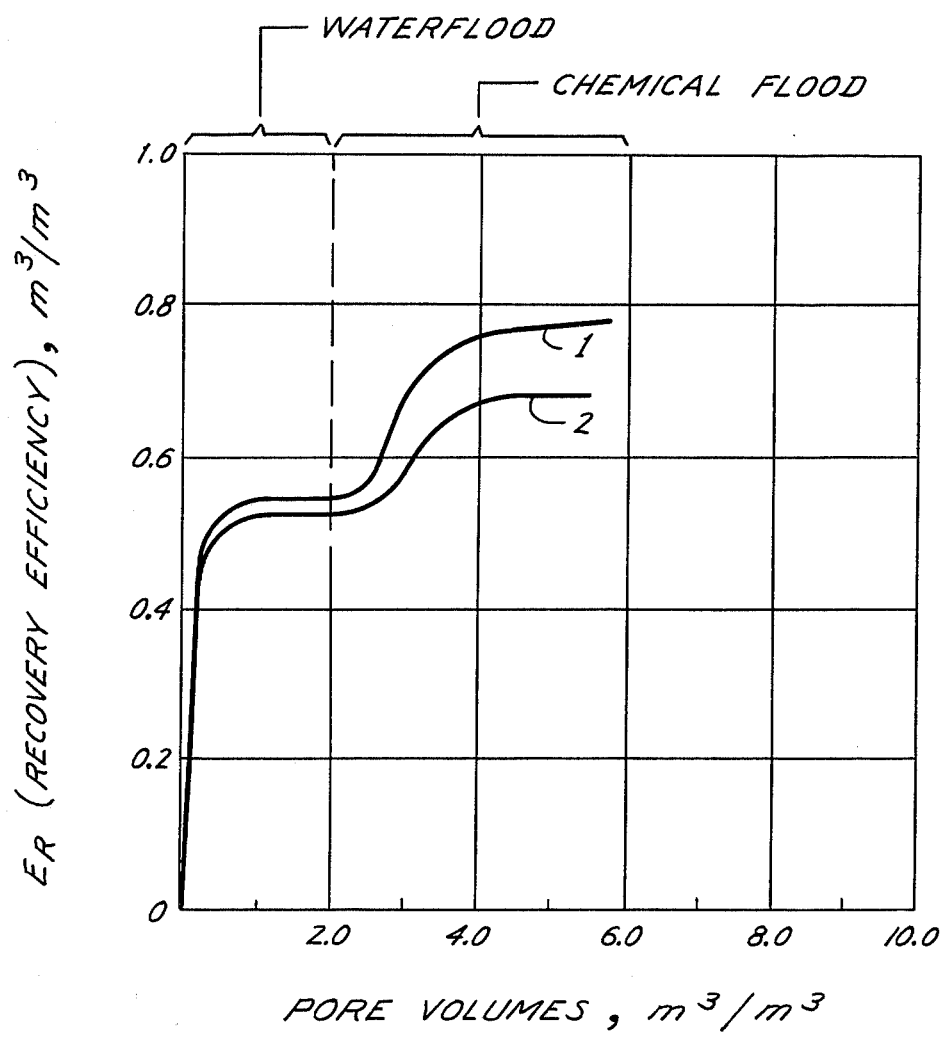

My invention pertains to a surfactant fluid injection oil recovery process, and more particularly to a method of treating the surfactant fluid prior to injecting it into a subterranean, oil-containing formation for the purpose of improving the phase stability, injectability, and oil displacement effectiveness of the fluid. The fluid properties are improved as described above by subjecting the surfactant fluid to a very high shear rate for a minimum period of time sufficient to accomplish the described objectives. Specifically, the fluid should be subjected to a shear rate of at least 150 sec$^{-1}$ and preferably at least 250 reciprocal seconds. The treating time necessary to accomplish the desired improvement in fluid properties is at least 0.1 minute and preferably at least 0.5 minutes, or for a period of time at least sufficient to eliminate any turbidity in the fluid. The shorter treating periods are most effective with the highest shear rate treatment, within the above described range. The product of shear rate in sec$^{-1}$ and treating time in minutes should be from 15 to 125.

While other surfactant fluids are benefitted by the process of my invention, I have found that the process described herein is especially beneficial when used in connection with a surfactant-containing fluid which contains relatively high salinity and which contains as the principal or substantially the only surface active agent present therein, a sulfonated and ethoxylated surfactant. Specifically, the salinity of the fluid will normally be in excess of 20,000 and preferably in excess of 70,000 parts per million total dissolved solids. The total salinity may include appreciable quantities of divalent ions, usually calcium and magnesium, which may be in the range of from 200 to 15,000 parts per million. Generally, the salinity of the surfactant fluid is largely determined by the salinity, including the divalent ion concentration, of the water present in the oil formation into which the surfactant fluid is to be injected. Ideally, the surfactant should be tailored so it exhibits optimum effectiveness for low surface tension oil displacement purposes at the salinity and divalent ion concentration values of the water present in the formation, and the surfactant fluid salinity and divalent ion concentration should be adjusted to at least this same salinity.

The preferred surfactant for use in the fluid to be employed in the process described herein is a water soluble salt of an alkyl or alkylarylpolyalkoxyalkyl sulfonate, having the following general formula:

$$RO(R'O)_nR''SO_3M^+$$

wherein R is an aliphatic group, usually an alkyl group, either linear or branched, having from 9 to 25 and preferably from 12 to 18 carbon atoms, or an alkylaryl group, such as a benzene, toluene or xylene having attached thereto at least one alkyl group, either linear or branched, and having from 6 to 18 and preferably from 9 to 15 carbon atoms; R' is ethylene or a mixture of ethylene and higher molecular weight alkylene groups such as propylene, etc. with relatively more ethylene than higher molecular weight alkylene, R'' is ethylene, propylene, hydroxy propylene or butylene, and M is sodium, potassium, lithium or ammonium; and n is a number from 2 to 10 and preferably from 3 to 7. Since the surfactant molecule is frequently a mixture of slightly different compounds with differing alkyl groups and/or differing in the number of ethylene oxide groups attached thereto, n represents the average number of ethylene oxide or alkylene oxide groups, and so n may be an integer or a fraction. The surfactant solution may also contain trace amounts (0.02-0.5% by volume) hydrocarbons.

It has been found that the above described alkyl or alkylarylpolyalkoxyalkyl sulfonate salt is a particularly effective surfactant in single surfactant form, and is especially effective for use in displacing oil from formations containing water having relatively high salinities, e.g. water salinities in the range of 50,000 to 225,000 parts per million total dissolved solids, and exhibits the additional desirable property of being stable at relatively high temperatures as are frequently encountered in subterranean formations, without hydrolyzing or becoming insoluble as some surfactants are prone to do. The compound has been tested for long periods of time at temperatures of 240° F. (116° C.) and found to be quite stable up to at least this temperature.

The surfactant fluid may be sheared in the field by pumping the fluid through one or more plates each having one or more relatively small orifices e.g., in the range of 0.60 mm (0.0236 in) to 2.0 mm (0.0787 in) diameter, with high pressure differentials across the plates e.g. in the range of 300 KPa (429.81 psi) to 7000 KPa (1002.9 psi). Very high speed rotary mixing devices may also be used.

In the case of using the above-described preferred surfactant, an alkylarylpolyalkoxyalkyl sulfonate or alkylpolyalkoxyalkyl sulfonate, and concentration will ordinarily be from about 0.05 to 5.0 and preferably from about 0.5 to about 2.0 percent by weight.

The volume of surfactant fluid injected will ordinarily be from about 5 to about 200 pore volume percent and preferably from about 10 to about 50 pore volume percent. There is generally no technical objection to the use of greater volumes of surfactant fluid than given above, although it is economically unjustified to use a greater volume of surfactant fluid than is sufficient for displacing oil.

EXPERIMENTAL SECTION

For the purpose of demonstrating the nature and magnitude of the improvements in surfactant fluid properties resulting from application of the process of my invention, the following experiments were performed.

In example one, two surfactant fluids were prepared. The first, referred to below as Fluid A, was a surfactant solution prepared in a brine having a total salinity of 77,400 parts per million total dissolved solids, including 9000 parts per million divalent ions. The surfactant was a sodium nonylphenolpolyethoxyethyl sulfonate having an average of 3.15 ethoxy groups per molecule. The concentration of surfactant was 1.0 percent by weight.

Surfactant Fluid B comprised a 1.0 percent by weight of the sodium salt of dodecylbenzenepolyethoxyethyl sulfonate with an average number of ethoxy groups per molecule being about 4.5.

In the data reported in Table I below, a sample of each surfactant fluid was stirred in a normal fashion employing a rotary mixer at a speed of about 200 rpm. An otherwise identical sample of each fluid was sheared in a Waring® blender at high speeds, approximately 20,000 rpm, (333 sec$^{-1}$) for two minutes. The interfacial tension values of the resultant fluids were measured and data are reported below. The capillary displacement values were also determined which is another indication of the effectiveness of the surfactant fluid for displacing petroleum. Capillary displacement values represent the displacement of petroleum in a closed end glass capillary tube submerged in the surfactant fluid, measured at 300 and 600 seconds, both at room temperature (78° F. 25.6° L C. and at 43° C. (109° F.).

It can be seen from the data given in Table I below, that the interfacial tension of both Fluid A and Fluid B are significantly lower for the sample which was subjected to high shear than the sample which was simply stirred in a normal laboratory mixer. Moreover, the magnitude of the capillary displacement was greater for both high shear treated fluids than for the stirred fluids, both at room temperature and at 43° C.

TABLE I

|  | Fluid A | | Fluid B | |
| --- | --- | --- | --- | --- |
|  | Stirred | Sheared | Stirred | Sheared |
| Interfacial Tension (millidines/centimeter) | 4.4 | <1 | 16 | 5.8 |
| Capillary Displacement Room Temperature - 24° C. (75° F.) | | | | |
| Millimeters/300 seconds | 6.2 | 9.5 | 1.5 | 9.5 |
| Millimeters/600 seconds | 8.3 | 13.2 | 3.9 | 12.1 |
| At 43° C. (110° F.) | | | | |
| Millimeters/300 seconds | 11.9 | 9.8 | 1.7 | 11.9 |
| Millimeters/600 seconds | 18.0 | 11.1 | 4.8 | 15.6 |

In addition to the measurements for which data are contained in the above table, the sheared and mixed fluids were both inspected visually. In both Fluid A and Fluid B, the high shear treated samples were much less turbid than the samples which were simply stirred for the same period of time. This indicates that the sheared fluids could be injected with much less plugging and related injectivity problems than fluids which were stirred or mixed at lower speeds.

The samples were further examined for phase stability. The stirred fluids separated under static conditions at room temperature after several days, whereas no surfactant separation was observed in the sheared fluid after three weeks of storage under static conditions at room temperature.

Two oil displacement tests were preformed in linear cores, one using a mixed but unsheared fluid and one using a sheared but otherwise identical surfactant fluid. In each run, cores were saturated with oil and then waterflooded to a high water cut before surfactant fluid injection was begun. In each run, the surfactant fluid contained 3.0 percent by weight of sodium dodecylbenzene-tetra-ethoxyethyl sulfonate and 3.0 percent ligno-sulfonate (to reduce surfactant adsorption) in a field brine containing 85,000 ppm total salinity. A 14 pore volume percent slug of surfactant fluid was injected and followed by water containing 1000 parts per million Kelzan ® bio polymer, and finally by field water. The fluid for run 2 was mixed in a conventional laboratory mixer at 200 rpm for 2 minutes whereas the fluid for run 1 was sheared in a blender at 20,000 rpm (333 sec$^{-1}$) for 2 minutes. It can be seen from the attached FIGURE that oil recovery was substantially improved using the sheared fluid (curve 1) as compared to the run (curve 2) using an otherwise identical fluid mixed for the same time at low speed. The tertiary oil recovery and changes in oil saturation for runs 1 and 2 are given in Table II below.

TABLE II

| Run | Sheared | % Tertiary Oil Recovery | Change in Oil Saturation |
|---|---|---|---|
| 1 | yes | 53.5 | .157 |
| 2 | no | 32.0 | .101 |

From the data in Table 11 above, it can be seen that the tertiary oil recovery increased from 32.0 percent to 53.5 percent, an increase of 67 percent, resulting entirely from the effect of shearing the surfactant fluid at 20,000 rpm for 2 minutes.

In an effort to obtain more general and practical shearing data, additional tests were undertaken. Results are reported herein.

Two shear methods were compared. In one method, a Waring ® blender operating at approximately 20,000 rpm was used to drive a 360 cm$^3$ semi-micro blending vessel. Two hundred cm$^3$ aliquotes were sheared for 1 minute with this assembly.

The second method utilized pressure gradients to generate shear forces. Compressed gas was used to force solution through a 0.79 mm (0.031 in.) diameter by 1.98 mm (0.078 in.) long orifice in a steel plate. The solution impinged on a flat surface located 2.4 mm (0.094 in.) below the orifice outlet. Liquid was collected at atmospheric pressure from 7.03 mm (0.277 in.) I.D. outlet.

Solution transparency may be gained by virtue of the internal phase (surfactant micells) being dispersed in such small particles that refraction does not occur because the particle size of the emulsions is several times smaller than the wavelength of light. In general, particle size correlates to appearance in the following way:

| Particle Size | Appearance |
|---|---|
| 0.05 micron and smaller | Transparent |
| 0.05–0.1 micron | Translucent |
| Greater than 0.1 micron | Cloudy |

Shearing methods were studied by measuring relative turbidities solution containing 5 kg/m$^3$ of a sulfonated, 6 molar ethoxylated, pentadecylphenol. In contrast to studies with solfonated, 4 molar ethoxylated dodecylphenol, studies with the 6 mole pentadecaphenol sulfonate solution were not complicated by phase separation. The solution was prepared in an oil-field brine containing 132 kg/m$^3$ total dissolved salts with 30 kg/m$^3$ divalent cation ions (reported as calcium carbonate equivalents). The solution was stirred for 20 hours at approximately 300 rpm with a laboratory magnetic stirrer. Aliquots were withdrawn and sheared through the shear cell with various pressure gradients. An aliquot was also sheared in the Waring ® blender, and another aliquot was stirred for 4 days. After aging the samples for four days, relative turbidities were determined with a spectrophotometer using 580 mm light with a 0.64 mm path length. A solution sheared with 6890 kPa (1000 psi) pressure gradient was used as the reference sample (i.e., the instrument was calibrated to read 100% transmission with this sample in the optical path).

The data in Table III below show the following.
1. Shear cells of the type described above are capable of reducing surfactant micellar particle size.
2. Increasing stirring time does not alter particle size perceptually.
3. A pressure gradient of approximately 4130 kPa (600 psi) in the shear cell produced the same effect as shearing for 1 minute in a Waring ® blender operating at 20,000 rpm.

TABLE III

SHEARING AND LIGHT TRANSMISSION

| Treatment | Relative light Transmission |
|---|---|
| Sheared - ΔP = 6890 kPa; Aged | 100 |
| Sheared - ΔP = 5170 kPa; Aged | 94 |
| Sheared 1 min. in Waring blender; Aged | 87 |
| Sheared - ΔP = 3450 kPa; Aged | 82 |
| ΔP = 1720 kPa; Aged | 62 |
| ΔP = 861 kPa; Aged | 41 |
| Stirred - 96 hours | 8 |
| Stirred - 20 hours, Aged | 8 |

Shearing altered the phase stability and interfacial tension of a 10 kg/m$^3$ dodecylbenzenetetraethoxyethyl sulfonate solution prepared in an oil-field brine with 85 kg/m$^3$ total dissolved salt with 25 kg/m$^3$ total hardness. When phase stability problems were observed, the surfactant separated from the bulk of the solution in a viscous, lower phase. Solutions that were stirred and sheared were allowed to settle and the upper phase was analyzed for surfactant. Surfactant losses from this phase were determined from material balances. In addition, the two phases were mixed and capillary displacements were measured. Crude oil thinned to reservoir viscosity with 0.25 m$^3$/m$^3$ heptane was used as the hydrocarbon.

The measurements (Table IV) show the following:
1. Shearing increased capillary displacement.
2. Phase separation for this particular fluid was eliminated by shearing provided that the pressure drop across the shear capillary was equal or greater than 2760 kPa (395 psi).
3. The shear cell was as effective as shearing 1 minute in a a Waring ® blender, provided that the pressure drop was equal or greater than 2760 kPa (395 psi).

TABLE IV

SHEARING, CAPILLARY DISPLACEMENT AND STABILITY

| Treatment | Capillary Displacement | | Stability |
|---|---|---|---|
| | mm/5 min. | mm/10 min. | c/co |
| Stirred | 0.5 | 1.2 | 0.27 |
| ΔP = 689 | 5.2 | 12.3 | 0.83 |
| ΔP = 1380 | 9.0 | 18.8 | 0.93 |
| ΔP = 2070 | 9.1 | 19+ | 0.97 |
| ΔP = 2760 | 5.2 | 8.2 | 1.00* |
| ΔP = 3450 | 8.9 | 18.0 | 1.00* |
| ΔP = 5170 | 8.3 | 16.6 | 1.00* |
| ΔP = 6890 | 7.6 | 15.4 | 1.00* |
| ΔP = 9646 | 10.9 | 20+ | 1.00* |

TABLE IV-continued

SHEARING, CAPILLARY DISPLACEMENT AND STABILITY

| Treatment | Capillary Displacement | | Stability |
|---|---|---|---|
| | mm/5 min. | mm/10 min. | c/co |
| Waring Blender | 5.4 | 12.2 | 1.00* |

*No phase separation

Thus it can be seen from the foregoing that treating a surfactant containing fluid, especially one in which the sole surfactant utilized is a water soluble salt of an alkyl or alkylarylpolyalkoxyalkyl sulfonate in a relatively high salinity environment by subjecting the fluid to high shear for a period of time sufficient to reduce the turbidity of the fluid, significantly increases the effectiveness of the surfactant fluid for low surface tension oil displacement, improves the long term phase stability of the fluid, decreases the injectivity problems associated with injecting surfactant into a subterranean formation for a long period of time, and thereby greatly improves the effectiveness of the surfactant fluid surfactant waterflooding for oil recovery purposes.

While my invention has been described in terms of a number of specific illustrative embodiments, it is clearly not so limited since many variations thereof will be apparent to persons skilled in the related art without departing from the true spirit and scope of my invention. It is my intention and desire that may invention be limited and restricted only by those limitations and restrictions appearing the claims appended immediately hereinafter below.

I claim:

1. In a method of recovering petroleum from a subterranean permeable, petroleum-containing formation, said formation containing water having a salinity of at least 20,000 parts per million total dissolved solids, said formation being penetrated by at least one injection well and by at least one production well, both wells being in fluid communication with the formation, comprising injecting an aqueous, surfactant-containing fluid into the formation via the injection well to displace petroleum toward the production well, from which it is recovered to the surface of the earth, said surfactant fluid containing an alkylpolyalkoxyalkylene sulfonate or alkylarylpolyalkoxyalkylene sulfonate surfactant having the following formula:

$$RO(R'O)_nR''SO_3^-M^+$$

wherein R is an alkyl group having from 9 to 25 carbon atoms, or an alkylaryl group, containing at least one alkyl substituent containing from 9 to 15 carbon atoms, R' is ethylene or a mixture of ethylene and higher molecular weight alkylene with relatively more ethylene than higher molecular weight alkylene, R'' is ethylene, propylene, hydroxy propylene or butylene, n is a number from 2 to 10 and $M^+$ is sodium, potassium, lithium or ammonium, wherein said improvement for increasing said phase stability and injectability of a surfactant fluid, and improving its low surface tension oil displacement effectiveness, which comprises:

shearing the surfactant fluid at the surface at a shear rate of at least 150 reciprocal seconds for a period of time of at least 0.1 minutes and sufficient to render the surfactant fluid less turbid prior to injecting it into the formation via the injection well.

2. A method as recited in claim 1 wherein the shear rate is at least 250 reciprocal seconds.

3. A method as recited in claim 1 wherein the time at which the surfactant fluid is sheared is at least 0.5 minutes.

4. A method as recited in claim 1 wherein the alkyl or alkylarylpolyalkoxyalkyl sulfonate surfactant is substantially the only surfactant present in the fluid.

5. A method as recited in claim 1 wherein the product of shear rate in $sec^{-1}$ and time of shearing in minutes is from 15 to 125.

* * * * *